United States Patent [19]

Miyoshi et al.

[11] 3,764,591

[45] Oct. 9, 1973

[54] PROCESS FOR POLYMERIZATION OF αOLEFIN

[75] Inventors: Katsuyoshi Miyoshi, Chigasaki; Yoichi Iwasaki, Yokohama; Yunichi Hotta; Masaki Fujii, both of Yokkaichi, all of Japan

[73] Assignee: Toho Titanium Company Limited, Tokyo, Japan

[22] Filed: Dec. 28, 1971

[21] Appl. No.: 213,166

[30] Foreign Application Priority Data
Dec. 28, 1970 Japan.............................. 45/127992

[52] U.S. Cl. ....... 260/88.2 R, 252/429 B, 260/93.7, 260/94.9 C
[51] Int. Cl. ............................. C08f 1/56, C08f 3/10
[58] Field of Search ................ 252/429 B; 260/93.7, 260/94.9 C, 88.2

[56] References Cited

FOREIGN PATENTS OR APPLICATIONS

| | | |
|---|---|---|
| 888,856 | 2/1962 | Great Britain |
| 2,029,890 | 12/1970 | Germany.......................... 260/94.9 C |
| 828,201 | 2/1960 | Great Britain ................. 260/94.9 C |

Primary Examiner—Joseph L. Schofer
Assistant Examiner—Edward J. Smith
Attorney—Norman F. Oblon et al.

[57] ABSTRACT

α-olefin polymerization is effected in the presence of a catalyst comprising: (1) an organo aluminum compound, and (2) a compound prepared by milling a halogen compound of titanium, wherein said titanium ion has a valance of less than the maximum valence, with an α, β-unsaturated carboxylic ester and thereafter treating with 0.1 – 5 mole percent of oxygen, based on said titanium compound.

8 Claims, No Drawings

3,764,591

PROCESS FOR POLYMERIZATION OF αOLEFIN

BACKGROUND OF THE INVENTION

1. Field Of The Invention

This invention relates to a process for the polymerization of an α-olefin. More particularly, this invention relates to an improved process for polymerizing and α-olefin using a novel catalyst composition comprising an organo aluminum compound and a titanium compound.

2. Description Of Prior Art

It is well known that crystalline polyolefins can be prepared by polymerizing an olefin in the presence of a catalyst composition comprising an organo aluminum compound, or a mixture of an organo aluminum compound, and other additives (hereinafter referred to simply as "organo aluminum compound") together with titanium halide. However, when propylene is polymerized in the presence of a catalyst composition of titanium trichloride and triethyl aluminum, or diethyl aluminum chloride, only 70 – 90 percent of the total weight of the product will be a crystalline polymer, i.e., one which is insoluble in boiling n-heptane. The remaining amount is a non-crystalline component which has more limited usage. However, separation of the non-crystalline polymer from the crystalline polymer is a rather complicated operation, which requires larger scale apparatus, and hence is not industrially desirable.

It would be quite attractive, therefore, to provide a method of decreasing the extent of formation of the non-crystalline polymer byproduct.

SUMMARY OF THE INVENTION

Accordingly, it is an object of this invention to provide a process for polymerization of α-olefins to obtain a high yield of crystalline polymer at a high rate of polymerization.

It is another object of this invention to provide a catalyst for polymerizing α-olefins which will result in high yields of crystalline polymer, with high polymerization velocities.

These and other objects, as will hereinafter become more readily apparent, have been attained by a catalyst composition which comprises an organo aluminum compound and a compound prepared by milling a halogen compound of titanium, wherein the titanium ion has a valence of less than the maximum valence, with an α, β-unsaturated carboxylic ester, and then treating the mixture with oxygen.

DETAILED DESCRIPTION OF PREFERRED EMBODIMENTS

The halogen compound of titanium used for this invention can be prepared by reducing a tetravalent titanium compound, such as a tetravalent titanium halide compound, by conventional techniques with a hydrogen, metallic aluminum, metallic titanium, metalhydride, or an organo metallic compound, such as an organo aluminum compound, e.g., triethyl aluminum, dialkyl aluminum halide, etc.

Suitable titanium compounds which are useable for this purpose include titanium trichloride. α, β-unsaturated carboxylic ester used herein may be an acrylic ester, an α-and/or β-substituted acrylic ester, or an unsaturated polyvalent carboxylic ester having at least one of carboxylic ester radical in the α-position of the ethylenic double bond, such as the maleic diesters. The α-and/or β-substituted radicals may be a lower alkyl radical, (preferably up to six carbon atoms), a phenyl radical, or a tolyl radical. The alcohol component for the ester can be monovalent lower alkanol radical. It is especially preferable to use such lower alkyl acrylates as methyl acrylate, ethyl acrylate, butyl acrylate, methyl methacrylate, ethyl methacrylate, isobutyl methacrylate, diethyl fumarate and diethyl maleate, methyl crotonate, diethyl isocrotonate, diethyl itaconate, methyl cinnamate, or the like.

The oxygen used in this process is preferably oxygen gas per se, or oxygen gas mixed with an inert gas, such as nitrogen or argon. The oxygen is usually used in amounts of 0.1 mole percent – 5 mole percent based on the mole percent of the titanium compound. If the oxygen is used in amounts of more than 5 mole percent, the catalytic activity will be significantly decreased, and the yield of crystalline polymer will be decreased, whereas, if the oxygen is used in amounts of less than 0.1 mole percent, it will be difficult to attain effective results as far as increased yield of crystalline polymer and catalytic activity are concerned.

The oxygen treatment can be conducted at any appropriate time before, after or within the milling operation for modifying the titanium compound with the α, β-unsaturated carboxylic ester. The milling operation can be carried out by any suitable process, such as by using such standard milling devices as ball mill, vibration mill, etc.

The α, β-unsaturated carboxylic ester should be used in amounts of 0.1 – 50 percent by weight, preferably 1 – 30 percent by weight, and especially 3 – 20 percent by weight, based on the titanium halide compound.

During the milling operation, it is necessary to control the temperature of the mill at −50°C. to +50°C., preferably −20°C. to +30°C., by removing the exothermic heat generated by the reaction of the titanium compound, the α, β-unsaturated carboxylic ester, and the oxygen, and by removing the heat caused by the milling. An excess temperature rise will be adverse to the catalytic activity of the end product.

The resulting titanium compound catalytic component modified with the α, β-unsaturated carboxylic ester and oxygen, is used together with the conventional organo aluminum compound Ziegler catalyst and if preferable, with other catalytic components such as a suitable electron donor.

The organo aluminum compound can be any compound having the general formula:

$$AlR_n X_{3-n}$$

wherein R represents hydrogen, an alkyl group or an aryl group; X represents a halogen atom, alkoxy group or trialkyl siloxy group; and $n$ represents an integer of from 1 – 3.

Suitable organo aluminum compounds include the trialkyl aluminums, such as triethyl aluminum, tripropyl aluminum and tributyl aluminum; dialkyl aluminum halides, such as diethyl aluminum chloride, diethyl aluminum bromide and dibutyl aluminum chloride; the alkyl aluminum dihalides, such as ethyl aluminum dichloride; and butyl aluminum dichloride; the dialkyl aluminum alkoxides, such as diethyl aluminum ethoxide and diethyl aluminum methoxide; pentaalkyl siloxy allene; alkyl aluminum alkoxy halides; alkyl aluminum sesquihalides, such as ethyl aluminum sesquichloride;

aryl aluminum compounds and alkylaryl aluminum compounds.

A wide range of α-olefins can be polymerized in accordance with this invention, such as ethylene, propylene, butene-1, pentene-1, and hexene-1, etc.

This process can be used for homopolymerization or copolymerization of olefins represented by the general formula: $CH_2=CHR$, wherein R is hydrogen or a lower alkyl group.

In view of the importance of the crystallinity of the polymer formed, this process is advantageously utilized in the homopolymerization of propylene or the copolymerization of propylene and other monomers, which are capable of undergoing copolymerization therewith, as, for example, ethylene. It is suitable for preparing propylene-ethylene copolymers, such as those having an ethylene content of less than 10 percent by weight based on the copolymer.

The polymerization can be conducted continuously or batchwise by solution polymerization, slurry polymerization or vapor phase polymerization, in the presence of the catalyst composition of this invention.

The reaction can be conducted at 0° – 120°C., preferably 50° – 90°C. under a pressure of from atmospheric pressure to 100 atm. and preferably 10 – 60 atm. If desired, a molecular weight regulator, such as hydrogen, can be used. Suitable polymerization medium used for the solution or slurry polymerization can be the aliphatic hydrocarbons, e.g., hexane, heptane; the alicyclic hydrocarbons, e.g., cyclohexane; the aromatic hydrocarbons, e.g., toluene. The resulting polymer can usually be recovered in the form of a slurry.

Good results are attainable when the molar ratio of Al/Ti is between 0.1 – 100 and preferably 0.5 – 10.

Having now generally described the invention, a further understanding can be attained by reference to certain specific Examples which are provided herein for purposes of illustration only and are not intended to be limiting unless otherwise specified.

EXAMPLE 1

Titanium tetrachloride was reduced with metallic aluminum to yield a trivalent titanium compound having the formula: $Ti_3AlCl_{12}$. The titanium compound was charged to a vibration mill of 0.3 l. of crushing material volume, and having 12 mm. diameter steel balls to two-thirds of the total volume. The titanium compound was milled for 50 hours in an atmosphere of argon, and then 5 percent by weight of methyl methacrylate, based on the titanium compound, was admixed therewith and further milled at 10°C. for 10 hours. 1 mole percent of oxygen was then charged to the mill and further milled at 10°C. for 5 hours.

Into a 1,500 cc. stainless steel autoclave purged with nitrogen, 500 cc. of heptane, 0.75 g. of diethyl aluminum monochloride and the resulting titanium compound were charged and propylene gas was supplied to polymerize propylene at a propylene pressure of 4.03 kg/cm² at 70°C. for 2 hours.

Following the polymerization, a mixture of methanol and isopropanol was charged to the reactants and stirred, filtered, and washed to yield a solid polymer.

In the following formula, the amount of the resulting polymer is shown as (B). The resulting solid polymer is extracted with boiling heptane for 6 hours to yield a heptane-insoluble polymer. The amount of the heptane-insoluble polymer is shown as (C). The amount of polymer remaining in the solvent is shown as (A). The yield of the isotactic polymer (D) can thus be calculated by the formula:

$$D = C/(A + B) \times 200$$

The yield of atactic polymer can be calculated by the formula:

$$100 - D$$

The results are shown in Table I.

EXAMPLE 2

The process of Example 1 was repeated, except that after admixing methyl methacrylate within the titanium compound, the milling operation was carried out for 10 hours and after supplying 2 mole percent of oxygen, the milling operation was carried out for 5 hours.

The results are shown in Table I.

EXAMPLE 3

The process of Example 1 was repeated, except after admixing methyl methacrylate with the titanium compound, the milling operation was carried out for 15 hours. After supplying 1 mole percent of oxygen, however, milling was not continued.

The results are shown in Table I.

EXAMPLE 4

The process of Example 1 was repeated, except that 16 percent by weight of methyl methacrylate based on titanium chloride compound of $Ti_3AlCl_{12}$ was added.

The results are shown in Table I.

EXAMPLE 5

The process of Example 1 was repeated, except using the following.

Using the vibration mill as shown in Example 1, titanium trichloride compound, having the formula: $Ti_3AlCl_{12}$ was milled in an argon atmosphere at −10°C. for 60 hours and 16 percent by weight of methyl methacrylate, based on titanium trichloride, was added to the mill at the primary period. 1 mole percent of oxygen gas was supplied to the mill and the milling operation was continued at −10°C. for 5 hours.

The results are shown in Table I.

EXAMPLE 6

The process of Example 1 was repeated, except 20 percent by weight methyl methacrylate based on titanium trichloride compound of $Ti_3AlCl_{12}$ was added and the temperature in the mill was maintained at −10°C.

The results are shown in Table I.

EXAMPLE 7

The process of Example 1 was repeated, except 30 percent by weight of methyl methacrylate based on the titanium trichloride compound of $Ti_3AlCl_{12}$ was added and the temperature in the mill was maintained at −20°C.

The results are shown in Table I.

Reference 1

The trivalent titanium compound having formula $Ti_3Al_1Cl_{12}$ resulting from reduction with metallic aluminum in accordance with Example 1, was milled for 50 hours and an additional 15 hours without admixing methyl methacrylate and oxygen.

The polymerization of propylene was conducted in accordance with Example 1 by using the titanium compound and diethyl aluminum monochloride.

The results are shown in Table I.

Reference 2

The process of Reference 1 was repeated, except the trivalent titanium compound having formula of $Ti_3Al_1Cl_{12}$ of Example 1 was milled for 60 hours and then 1 mole oxygen based on the titanium compound was admixed and was milled for 5 hours.

The results are shown in Table I.

TABLE I

|  | Ex. 1 | Ex. 2 | Ex. 3 | Ex. 4 | Ex. 5 | Ex. 6 | Ex. 7 | Ref. 1 | Ref. 2 |
| --- | --- | --- | --- | --- | --- | --- | --- | --- | --- |
| Catalytic efficiency PP(g)/catalyst (g) | 242.2 | 240.8 | 242.3 | 243.6 | 223.7 | 215.6 | 193.3 | 225.1 | 226.4 |
| Yield of isotactic polymer (percent) | 95.4 | 94.6 | 95.1 | 97.9 | 97.5 | 95.0 | 93.4 | 91.0 | 92.1 |
| Amount of atactic polymer (percent) | 4.6 | 5.4 | 4.9 | 2.1 | 2.5 | 5.0 | 6.6 | 9.0 | 7.9 |

As shown in the examples, a high yield of isotactic polymer can be produced in high catalytic efficiency by using the catalyst composition of this invention. It should, of course, be noted that an increase of 2 – 3 percent in yield of isotactic polymer is quite important, and significant from the point of view of large-scale industrial operations.

Having now fully described the invention, it will be apparent to one of ordinary skill in the art that many changes and modifications can be made thereto without departing from the spirit or scope of the invention.

What is claimed as new and desired to be secured by letters patent is:

1. A process for polymerization of propylene or a mixture of propylene and up to 10 percent by weight ethylene which comprises polymerizing said propylene or mixture in the presence of a catalyst composition comprising: (1) an organo aluminum compound and (2) a compound prepared by milling a halogen compound of titanium at a temperature of −50°C. − + 50°C., said titanium having a valence of less than its maximum valence, with 0.1 – 50 percent by weight based on the titanium compound of an $\alpha$, $\beta$-unsaturated carboxylic ester and treating with 0.1 – 5 mole percent of oxygen, based on the moles of titanium compound.

2. The process for polymerization according to claim 1, wherein the organo aluminum compound is selected from the group consisting of trialkyl aluminum, dialkyl aluminum halide, alkyl aluminum dihalide, dialkyl aluminum alkoxide, alkyl aluminum alkoxy halide, alkyl aluminum sesquihalide, aryl aluminum compounds and alkylaryl aluminum compounds.

3. The process of polymerization according to claim 1, wherein said $\alpha$, $\beta$-unsaturated carboxylic ester is selected from the group consisting of acrylic esters, substituted acrylic esters and unsaturated polyvalent carboxylic esters, wherein the alcohol component for the ester is a monovalent lower alkanol radical.

4. The process for polymerization according to claim 1, wherein said oxygen treatment occurs before the milling operation.

5. The process for polymerization according to claim 1, wherein said oxygen treatment occurs after the milling operation.

6. A catalyst which is useful for the polymerization of $\alpha$-olefins which comprises (1) an organo aluminum compound and (2) a compound prepared by milling a halogen compound of titanium, said titanium having a valence of less than its maximum valence, with 0.1 – 50 mole percent, by weight, based on the titanium compound of an $\alpha$, $\beta$-unsaturated carboxylic ester, and treating with 0.1 – 5 mole percent of oxygen based on the titanium compound.

7. The catalyst of claim 6, wherein the organo aluminum compound is selected from the group consisting of trialkyl aluminum, dialkyl aluminum halide, alkyl aluminum dihalide, dialkyl aluminum alkoxide, alkyl aluminum alkoxy halide, alkyl aluminum sesquihalide, aryl aluminum compounds and alkylaryl aluminum compounds.

8. The catalyst of claim 6, wherein said $\alpha$, $\beta$-unsaturated carboxylic ester is selected from the group consisting of acrylic esters, substituted acrylic esters and unsaturated polyvalent carboxylic esters, wherein the alcohol component for the esters is monovalent lower alkanol radical.

* * * * *